(12) United States Patent
Liashenko et al.

(10) Patent No.: US 12,397,497 B2
(45) Date of Patent: Aug. 26, 2025

(54) PRINTING DEVICE AND METHOD

(71) Applicants: Universitat Rovira I Virgili; Institucio Catalana De Recerca I Estudis Avancats, Barcelona (ES)

(72) Inventors: Ievgenii Liashenko, Eugene, OR (US); Andreu Cabot Codina, Barcelona (ES); Joan Rosell Llompart, Tarragona (ES)

(73) Assignees: Universitat Rovira I Virgili (URV), Tarragona (ES); Institucio Catalana de Recerca I Estudis Avancats (ICREA), Barcelona (ES)

( * ) Notice: Subject to any disclaimer, the term of this patent is extended or adjusted under 35 U.S.C. 154(b) by 429 days.

(21) Appl. No.: 17/609,313

(22) PCT Filed: May 5, 2020

(86) PCT No.: PCT/EP2020/062454
§ 371 (c)(1),
(2) Date: Nov. 5, 2021

(87) PCT Pub. No.: WO2020/225261
PCT Pub. Date: Nov. 12, 2020

(65) Prior Publication Data
US 2022/0203605 A1  Jun. 30, 2022

(30) Foreign Application Priority Data
May 7, 2019 (EP) .................................. 19382349

(51) Int. Cl.
*B29C 64/112* (2017.01)
*B29C 64/209* (2017.01)
(Continued)

(52) U.S. Cl.
CPC .......... *B29C 64/112* (2017.08); *B29C 64/209* (2017.08); *B29C 64/393* (2017.08);
(Continued)

(58) Field of Classification Search
CPC ...... D01D 5/0007–0092; B29C 64/112; B29C 64/209; B29C 64/393; B33Y 10/00;
(Continued)

(56) References Cited

U.S. PATENT DOCUMENTS 3,060,429 A * 10/1962 Winston .................. H04L 15/28
346/111
3,864,692 A * 2/1975 McDonnell ................ B41J 2/09
347/53

(Continued)

FOREIGN PATENT DOCUMENTS

| CN | 109049674 A | 12/2018 |
| EP | 2714405 A1 | 4/2014 |
| JP | 2012025142 A | 2/2012 |

OTHER PUBLICATIONS

International Search Report and Written Opinion of the International Searching Authority, mailed Jul. 23, 2020, for International Application No. PCT/EP2020/062448, 11 pages.

(Continued)

*Primary Examiner* — Jeffrey M Wollschlager
(74) *Attorney, Agent, or Firm* — Klarquist Sparkman, LLP

(57) ABSTRACT

Printing device comprising an ink reservoir that supplies ink to an exit of a nozzle forming an ink drop and comprising also a power supply that creates an electrostatic field which generates an inkjet, said inkjet carrying a net electrostatic charge and being deposited on a substrate for printing a three-dimensional item by means of a continuous fiber, characterized in that the printing device also comprises one (Continued)

or a plurality of electrodes that deflect said inkjet from a default trajectory in a continually controlled manner through modifying the voltage applied to each jet-deflection electrode. The printing method comprises the step of deflecting said inkjet from a default trajectory by continually modifying the electrostatic field generated around the inkjet by one or a plurality of electrodes.

15 Claims, 6 Drawing Sheets

(51) Int. Cl.
| | | |
|---|---|---|
| *B29C 64/393* | (2017.01) | |
| *B33Y 10/00* | (2015.01) | |
| *B33Y 30/00* | (2015.01) | |
| *B33Y 50/00* | (2015.01) | |
| *B33Y 50/02* | (2015.01) | |
| *B41J 2/095* | (2006.01) | |
| *B41J 2/175* | (2006.01) | |

(52) U.S. Cl.
CPC ............... *B33Y 10/00* (2014.12); *B33Y 30/00* (2014.12); *B33Y 50/02* (2014.12); *B41J 2/095* (2013.01); *B41J 2/175* (2013.01); *B33Y 50/00* (2014.12)

(58) Field of Classification Search
CPC ......... B33Y 30/00; B33Y 50/02; B33Y 50/00; B41J 2/095; B41J 2/175
See application file for complete search history.

(56) References Cited

U.S. PATENT DOCUMENTS

| | | | |
|---|---|---|---|
| 8,162,450 B2 | 4/2012 | Barbet | |
| 8,906,285 B2 | 12/2014 | Aksay et al. | |
| 2002/0089094 A1* | 7/2002 | Kleinmeyer | B82Y 30/00 |
| | | | 264/210.8 |
| 2008/0074477 A1 | 3/2008 | Schmitt | |
| 2009/0233057 A1* | 9/2009 | Aksay | D01D 5/0038 |
| | | | 427/469 |
| 2010/0222771 A1* | 9/2010 | Mitchell | B29C 48/92 |
| | | | 606/1 |
| 2013/0216724 A1* | 8/2013 | Lee | H10K 71/611 |
| | | | 427/466 |
| 2015/0266297 A1* | 9/2015 | Lee | B41J 2/06 |
| | | | 347/50 |
| 2016/0340534 A1* | 11/2016 | Wijesundara | C09D 11/52 |
| 2017/0216918 A1* | 8/2017 | Orme-Marmarelis | |
| | | | B22F 12/53 |

OTHER PUBLICATIONS

International Search Report and Written Opinion of the International Searching Authority, mailed Aug. 5, 2020, for International Application No. PCT/EP2020/062454, 9 pages.
Notice of Reasons for Rejection, Japanese Patent Application No. 2021-566270, 6 pages, Mar. 11, 2024.
Notice of Deficiencies, Israel Application No. 287836, 5 pages, Sep. 30, 2024.
Communication pursuant to Article 94(3) EPC, European Patent Application No. 20 722 594.7, 4 pages, Mar. 6, 2025.
Notice of Preliminary Rejection, Korean Patent Application No. 10-2021-7039034, 9 pages, Jul. 1, 2025.

* cited by examiner

PRINTING DEVICE AND METHOD

CROSS REFERENCE TO RELATED APPLICATIONS

This is the U.S. National Stage of International Application No. PCT/EP2020/062454, filed May 5, 2020, which claims priority to European Application No. EP19382349.9, filed May 7, 2019.

The present invention refers to a printing device and method that permit an enhanced and fast printing of items on a substrate by means of a thin fiber.

BACKGROUND OF THE INVENTION

Electrohydrodynamic (EHD) jet printing, sometimes referred to as e-jet printing, is a high-resolution printing technology where an ink jet is driven by an electrostatic field to print predefined designs. EHD jetting has been used with mechanical translation of the substrate or the nozzle to position the jet at predefined locations on a substrate, thus enabling the printing of solid items (structures, patterns, objects, etc.) from predefined designs. We will refer to EHD jet printing as the creation of such items by using an EHD jet which is continuous and does not break up into droplets. And we refer to EHD jet-deflection printing (our invention) as the case when exposure to a deliberately varied electrostatic field causes the jet to deflect in a controllable manner and thus to deposit the material in a preset location.

The EHD jetting phenomenon generates a fast moving and fine ink jet, which in EHD jet printing is collected on a substrate. The ink flows out of a channel through a small opening. We refer to this channel with small opening as nozzle. We refer to a collected jet as fiber. Virtually any liquid may be used for EHD jetting, which we will refer as ink. This ink may typically comprise any suitable combination of solvents, polymers, inorganic precursors, particles, and living cells. The jet diameter typically ranges from dozens of nanometers to a few micrometers. The jet is generally continuous but may break up spontaneously into liquid fragments (droplets) before it is collected; however, the invention does not relate to this scenario.

One of the greatest current challenges of material jetting technologies is to controllably deposit materials as very small 2D (two-dimensional) and 3D (three-dimensional) items at high speed. Currently EHD jetting is combined with mechanical translation of the substrate or the nozzle, to print patterns on a substrate. To print a preset design with proper accuracy by this method, the EHD jet speed as it approaches the substrate and the speed of stage translation must be matched, because when the jet is generated faster than it is properly positioned on the substrate, it accumulates on the substrate in an uncontrolled manner. EHD jets can be generated to move at speeds in the range between 0.5 and 5000 mm/s, but current systems cannot utilize this entire range. Even the best systems do not provide enough acceleration for allowing consistent speed of printing and the changes in the direction of motion cannot be fast enough, limiting the speed and resolution in both 2D and 3D printing. Very accurate printing can be done by proper mechanical translation stages, but the rate of deposition of accurate small items using a translation stage is too slow to be industrially relevant. The dynamic characteristics of translation stages, and particularly, their maximum speeds and accelerations, are insufficient to allow precise printing when the jet generation speed is at the upper end of the speed range mentioned earlier.

Some electrospinning devices are based on passive electrostatic control to collect aligned fibers at high throughput. However, such approaches cannot create predefined complex items on a substrate, as they lack deliberate control over the jet positioning over the substrate.

On the other hand, drop-on-demand (DoD) EHD printing technology is based on printing droplets one by one, which are produced by either breaking up an EHD ink jet or by operating the system under dripping regime. While this technique can reproducibly create electrically charged microdroplets or even nanodroplets which are readily collected on the substrate, the ink flow rate at which the production of droplets can be stabilized is very low, and it decreases as the droplet size is decreased (thus increasing printing resolution). Therefore, although the DoD technique has demonstrated outstanding printing resolution and positioning control, its inherent slow printing rate renders it impractical for industrial applications.

While continuous jet must be generated in a continuous fashion, a multitude of droplets can be generated either continuously or intermittently ("on demand"), depending on the ejection mechanism:

Intermittent droplet generation ("drop-on-demand") can be actuated by applying bursts of energy to liquid interphase, overcoming the surface tension, thus ejecting a portion of liquid ink and propelling it away from the liquid interphase.

Such intermittent or "on demand" droplet formation is based on creating a pressure wave strong enough to overcome surface tension and to separate a portion of ink from the liquid interphase. Multiple phenomena can be used to trigger such pressure wave, such as: piezoelectric, thermal, acoustic, etc., and were extensively studied and applied in ink-jet printing.

Jet-based droplet generation is achieved by first forming a continuous jet of ink, which subsequently undergoes Plateau-Rayleigh instability, where the surface tension forces develop swells on the jet which grow in time, eventually breaking off into separate ink portions or droplets. Such jet breakup is spontaneous but can also be controlled/triggered by feeding sound waves to the jet.

Liquid breakup happens by the action of surface tension forces (working towards minimizing the surface area) and is resisted and slowed down by the action of viscoelastic forces. The relative importance of these forces, thus the jet breakup behavior, strongly depends on ink composition. For some inks, such as polymer melts, jet breakup does not occur due to high viscosity of polymeric melts.

Furthermore, at equal resolution or width of the printing line, continuous jetting is advantageous because it can carry more volume of ink compared with intermittent jetting of droplets, where the jet is effectively interrupted between ejecting ink portions (switched on and off, where no material is ejected for large portion of pulsing period).

Additionally, continuous droplet generation has the disadvantage that droplet diameter is always larger than the jet diameter, which is detrimental to the printing resolution, or requires smaller jets for the same printing resolution than printing based on continuous-fiber deposition. This situation becomes even worse when droplets impact on the printing substrate and splash, increasing the contact area and further decreasing printing resolution. On the other hand, sufficiently solid fiber typically keeps its shape when deposited, resulting both in smaller voxel size and much higher aspect ratio, which are essential for microscopic 3D printing.

Continuous fiber deposition has yet another benefit for 3D printing of continuous features, such as lines and walls obtained by stacking of multiple fiber-layers. Such continuous features are useful in applications such as electronics, for creating conducting paths/electrodes, and scaffolds for tissue engineering, for example.

On the other hand, to obtain such features by printing of droplets, multiple droplets must be carefully positioned next to each other, which is a disadvantage which only gets more persistent as the printed pattern becomes more complex (for example, as a wall becomes taller). This is due to the "autofocusing effect" which attracts electrically charged droplets to places such as the crossing of 2 walls and results in printing defects such as pillars located on those crossings. Such challenges in the fidelity of the printed structure can be overcome by printing with a continuous fiber.

An additional benefit of fiber vs. droplet printing is the possibility to fabricate fibers from multiple materials, either by varying the fiber composition along the fiber length (switching printing materials) or by creating multiple material fibers (such as core-shell or empty tubes) by simultaneously feeding multiple materials through the nozzle, forming a compound jet.

Yet another benefit of fiber printing is that a sufficiently solid fiber can be suspended between two contact points in three dimensions, which can be hardly achieved by droplet-based printing.

Multiple benefits of printing with continuous fibers over printing using droplets are higher printing speed, higher resolution, higher freedom in ink formulation, and better 3D printing fidelity especially when 3D-printing continuous features.

Therefore, the present invention aims to bypass the limitations of these approaches by means of an active electrostatic control of a continuous EHD jet before it arrives to the substrate.

DESCRIPTION OF THE INVENTION

With the device and method according to the present invention it is possible to solve said limitations, providing other advantages that are described below.

The printing device according to the present invention is defined in claim 1, and the device comprises a reservoir that supplies ink to a nozzle, said nozzle forming an ink drop which generates an ink jet, said ink jet being deposited on a substrate for printing an item, wherein the printing device also comprises one or a plurality of electrodes, called jet-deflection electrodes, that deflect said ink jet from its default trajectory (namely, the trajectory that the jet would follow if no jet-deflection electrodes were present), thus controlling the jet's point of contact with the substrate. The jet is deflected periodically by applying periodically repeating signals to the jet-deflection electrodes. Consequently, when the translation stage is not moving, a repeating motif will produce the stacking of layers of fiber producing a printed 3D item, whereas, when the translation stage moves continuously during printing, the printed item is a repeating motif contained within a band.

The deflection of the ink jet is controlled by continuously modifying the electrostatic field around the jet generated by the jet-deflection electrodes, whose voltages are synchronized.

A single jet-deflection electrode can be used to deflect the EHD jet. However, one jet-deflection electrode can deflect the jet only in one direction normal to the default jet trajectory, while our invention allows the controlled deflection of the jet in any direction normal to the default jet trajectory.

Advantageously, the printing device also comprises a power supply that creates an electrostatic field for generating the EHD jet.

According to a first embodiment, two jet-deflection electrodes deflect said ink jet from the default jet trajectory in two different directions. By combining the deflections caused by two jet-deflection electrodes it is possible to deflect the jet towards any direction within the plane normal to the default jet trajectory. According to a second embodiment, four jet-deflection electrodes deflect said ink jet from the default jet trajectory, two electrodes in one direction and two electrodes in another direction, the two directions typically, but not necessarily, being orthogonal to each other and both being orthogonal to the default jet trajectory. Other embodiments in which one, three or more than four jet-deflection electrodes and a variety of jet-deflection electrode geometries and localizations are possible.

Furthermore, in the printing device according to present invention, the substrate and the nozzle can independently be movable in any direction. The relative motion between the translation stage and the nozzle can be achieved in a printing device either by translating the substrate or the nozzle.

Virtually any solid with sufficient electrical conductivity can be used as a substrate. The substrate may incorporate several materials, may have any dimensions, may be geometrically shaped other than as a flat/planar surface, and may even be flexible, deformable, porous, etc. The printing device can also comprise a camera for monitoring the printing process.

The printing device also comprises advantageously a generator that generates signals that are provided to the jet-deflection electrodes, wherein the jet-deflection electrodes are preferably connected to amplifiers for amplifying the signals generated from the generator.

Furthermore, the printing device according to the present invention also comprises means for controlling the deflection of the jet and the movement of the substrate or the nozzle, typically a computer with a software or equivalent control means. The control of the jet deflection is an active electrostatic control, implying that the software controls the printing process through its parameters (e.g. motif geometry, motif size, layer-by-layer overprinting frequency, number of layers deposited to create a printed 3D item, etc.).

According to a second aspect, a printing method according to the present invention is defined in claim 8, and the method comprises the following steps:

supplying ink from a reservoir to a nozzle;
forming an ink drop at the exit of said nozzle;
generating an ink jet;
printing a predefined design on a substrate to produce a printed item;

wherein the printing method also comprises the step of deflecting said ink jet by an electrostatic field generated by one or a plurality of jet-deflection electrodes, while the substrate or the nozzle can be moved either during printing or before and after printing.

Preferably, the voltages of the jet-deflection electrodes are synchronized for generating said electrostatic field.

Advantageously, the ink jet can be deflected from its default trajectory in any direction.

Furthermore, the jet is preferably generated by the action of an electrostatic field over the ink drop, and the ink is supplied from the reservoir to the nozzle, preferably in a substantially continuous manner.

According to the present invention, the electrostatic field used for jet deflection is continuously and deliberately changed by software, resulting in the electrostatic deflection of a charged EHD jet, thus controlling its trajectory in 3D space and thus continuously drawing pre-defined motifs on the substrate. Due to its nature, electrostatic position control readily provides dynamic characteristics (i.e. speed and acceleration) which surpass by many orders of magnitude those typically attainable by current state-of-the-art translation stages. This allows high-resolution printing of 2D and 3D items.

The device and method according to the present invention provides at least the following advantages:

The electrostatic control of EHD jet trajectory is advantageous compared to mechanical translation of the substrate or the nozzle because it provides much higher accelerations (e.g. as high as 500,000 m/s$^2$ by electrostatic control, compared to 20 m/s$^2$ reliable achievable by some mechanical translation stages) and displacement speeds (e.g. greater than 6 m/s by electrostatic control compared to 0.2 m/s by mechanical translation).

Superior acceleration is necessary to print complex items with high resolution and printing speed by an EHD jet. Superior acceleration is advantageous because it allows (a) to closely match the jet generation speed during printing, thus allowing nearly-constant printing speed, and (b) fast changes of the jet trajectory required to create sharp corners (down to 1 micron, typically) on the printed item.

In the present invention, mechanical translation of the substrate or the nozzle can be used for displacing the substrate or the nozzle either between consecutive printing events or during continuous printing event. Often, this action does not typically require demanding dynamic characteristics and precision. Thus, an additional advantage of this approach is the cost reduction involved by the use of no translation stage (e.g. roll-to-roll substrate translation) or of a translation stage with lower resolution and dynamic characteristics.

Furthermore, the present invention uses active electrostatic control which guides the EHD jet within a printing zone with high precision and temporal resolution to generate complex items on demand. The active electrostatic control is a substantial improvement over any active electrostatic control approaches in the prior art of EHD jetting. Such approaches did not permit the printing of a predefined design as it was limited to manual switching of voltages applied to jet-deflection electrodes and simple wavefunctions available in power generators, such as sinusoidal or sawtooth periodic wavefunctions.

Moreover, an additional advantage is that the software can be programmed to rapidly change printed motif geometry and size during printing process. This allows creating 3D items by assembly of printed layers which have the same or different motif geometry. Thus, 3D items with control over geometry in the 3 directions can be created in comparison to 2.5D items (when the printed motif geometry is constant for each layer).

The invention is also capable of active electrostatic control of EHD jet positioning within the printing zone of the substrate by using only 2 jet-deflection electrodes which deflect the jet in two different directions normal to the default jet trajectory. It is advantageous to have only 2 jet-deflection electrodes (compared to more) because only 2 control signals have to be computed, generated, and amplified. Having fewer independent channels for control signal generation and amplification reduces power consumption, simplifies the printing device, and makes it cheaper.

An additional advantage is that having 2 jet-deflection electrodes around the nozzle leaves more free space around the nozzle to locate additional elements, such as a gutter electrode for interrupting material deposition when needed. Thus, 2 jet-deflection electrode configuration allows extended functionality and is more convenient for practical use of the printing device.

To sum up, the printing method and device according to the invention provide much higher printing rate and positioning precision compared to other current additive manufacturing technologies on the market based on material jetting, revealing its industrial potential. Furthermore, the invention's material versatility allows manufacturing microscopic items and microscopic devices for a range of applications, such as energy storage, microelectronics, sensors, scaffolds for biological tissue engineering, etc.

In the present invention, continuous jet/fiber is used for printing of 3D structures, where resolution and the speed of printing are essential advantages over previously known methods. To increase the throughput of solid material deposited on the printing substrate, inks with high content of solid constituents are favored.

Advantageously, such inks tend to be very viscous (many orders of magnitude over the inks used for printing in using droplets formed from jet breakup) and thus effectively prohibit the jet breakup by the Plateau-Rayleigh instability.

Furthermore, certain ink components, such as polymers with high molecular weight or with branched molecular chains, significantly increase ink viscosity (even when added in small concentrations) and thus either preclude droplet formation, or must be present in minimal concentrations, which has the disadvantage of drastically decreasing the printing speed.

BRIEF DESCRIPTION OF THE DRAWINGS

For a better understanding of the above explanation and for the sole purpose of providing an example, some non-limiting drawings are included that schematically depict a practical embodiment.

DESCRIPTION OF PREFERRED EMBODIMENTS

Figure 1:
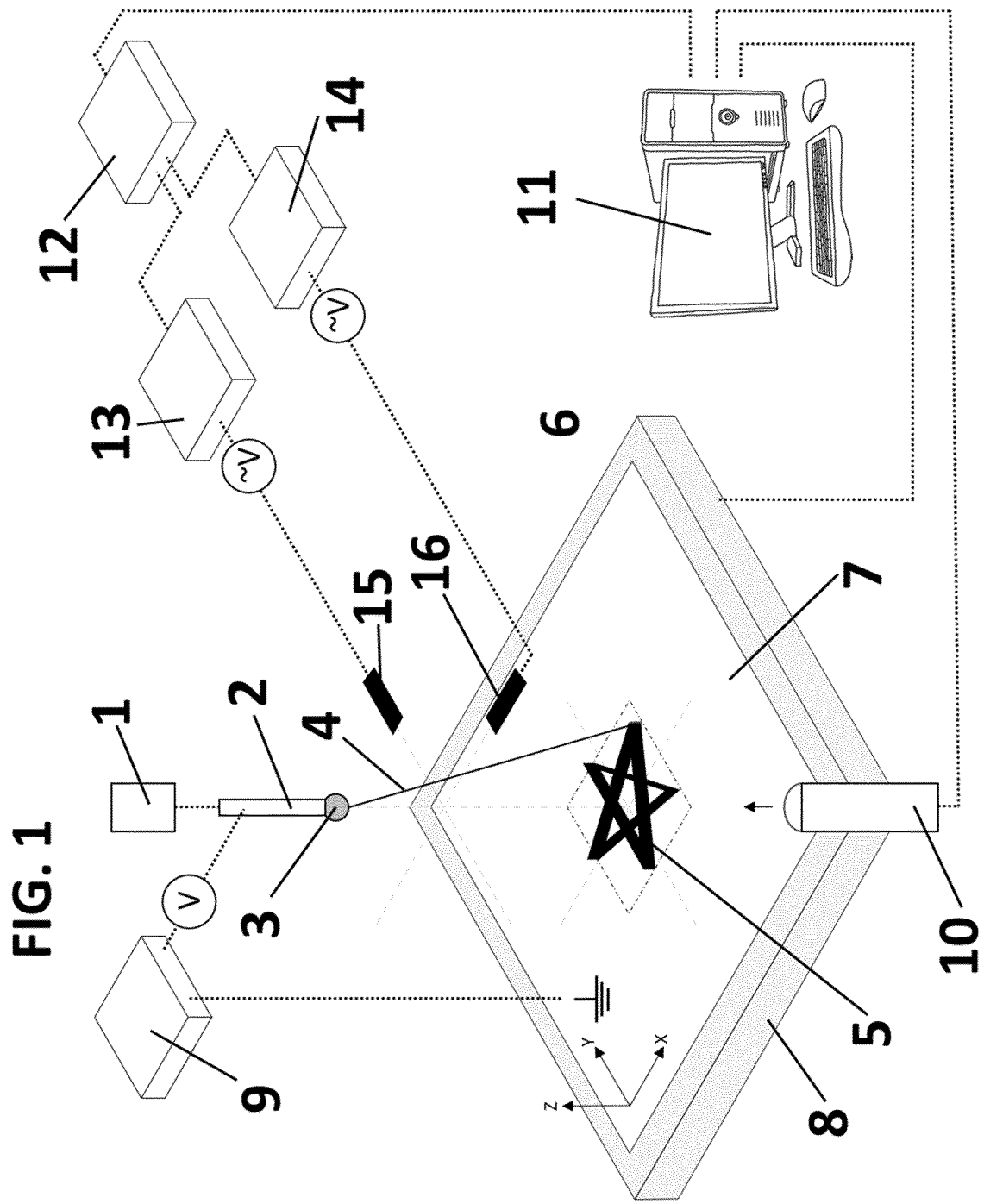
FIG. 1 is a diagrammatical perspective view of the printing device of the present invention, according to a first embodiment including two jet-deflecting electrodes.
Figure 2:
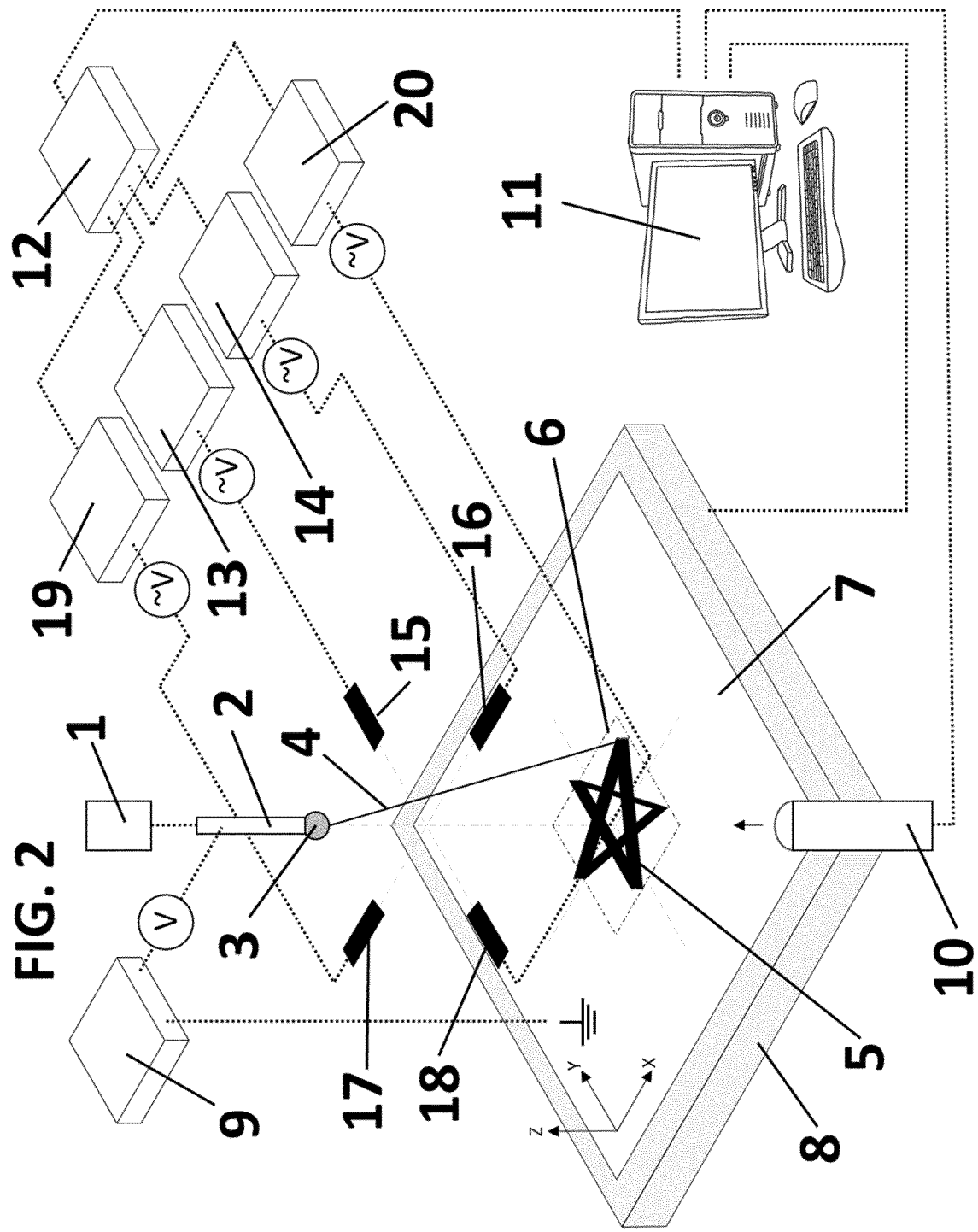
FIG. 2 is a diagrammatical perspective view of the printing device of the present invention, according to a second embodiment including four jet-deflecting electrodes.

FIG. 1 shows a first embodiment of the printing device according to the present invention, which comprises the following elements, whose operation will be described hereinafter:

1: ink reservoir
2: nozzle that receives ink from the reservoir
3: ink drop at the exit of the nozzle
4: ink jet generated from the ink drop
5: printed item
6: printing zone
7: substrate
8: translation stage controlled by computer and software
9: power supply electrically connected with the nozzle
10: camera for monitoring the printing process
11: computer including software for controlling the printing process
12: generator of jet-deflection signals
13, 14: amplifiers of the signals from generator
15, 16: electrodes for deflecting the jet in the Y and X directions, respectively In FIG. 2 a second embodiment is shown. For simplicity the same numeral references are used for indicating the same elements.

The only difference between both embodiments is that the second embodiment includes four jet-deflection electrodes 15, 16, 17, 18 and four corresponding amplifiers 13, 14, 19, 20.

In the present description we refer to a jet 4, and when said jet 4 is collected on the substrate it is called fiber.

The printing parameters are divided in two groups: 1) Jet generation parameters, namely, the parameters associated with the generation of the electrified ink jet. 2) Jet deflection parameters, which include parameters for controlling jet flight trajectory by modifying the electrostatic field surrounding the jet. A set of jet-deflection electrodes is used to modify the electrostatic field independently from jet generation. According to the XYZ coordinate system shown in FIG. 1 and FIG. 2, the default trajectory of the jet (without deflection by the jet-deflection electrodes) is parallel to the Z axis. Jet deflection enables active control of jet position in XY plane at any given instant of time, as well as controlling the speed of jet collection (also referred to as fiber collection speed) on a substrate. Hereinafter, relevant parameters which are used for controlling printing process or may influence printing results are discussed.

1) Jet Generation Parameters

The ink flow rate is the volumetric rate at which liquid ink is supplied from reservoir 1 to the exit of the nozzle. In the case when the ink is a melt (from a room temperature solid, for example a molten polymer), a heating system may be incorporated to the reservoir 1 and the nozzle 2 to maintain the ink in a molten state. The nozzle 2 is a thin tube which can be made of conductive or insulating material and typically is square cut (blunt ending) at the drop 3 end. The pendent drop 3 is formed by the ink accumulated at the exit of the nozzle 2. Electrical contact between power supply 9 and pendent drop 3 of liquid ink is necessary. This is typically done by either a wire connected to said power supply, on one end, and to the ink, on the other end; or by a wire connected to said power supply, on one end, and to the nozzle 2, when the nozzle 2 is made of or covered with an electrically conducting material, such as a metal, typically stainless steel or platinum. FIGS. 1 and 2 show this second electrical contact means.

The diameter of the opening of the exit end of the nozzle 2 is another parameter which influences electrostatic field around the pendant drop 3.

The size of the pendant drop 3 influences the surface area of ink/gas interface and thus defines the evaporation rate of any volatile solvent present in the ink from the pendant drop 3. The space surrounding liquid drop can be in vacuum or filled with a gas, which is typically air, but it can be another gas, such as synthetic air, nitrogen, carbon dioxide, or any of these with some small concentration of solvent vapor to limit the rate of solvent evaporation from the pendant drop.

Evaporation rate is influenced by the pendant drop's temperature, the surrounding gas temperature, the solvent vapor concentration in the gas phase (relative humidity, when the solvent is water), and by ink composition.

To control (increase or reduce or suppress) the rate of solvent evaporation, a gas stream containing a controlled amount of solvent vapor can be introduced around (coaxially) or in the vicinity of the jet. In addition, a gas stream can be introduced coaxially to the pendant drop at the exit of the nozzle, to shield the ink from ambient moisture. This is useful to prevent that ambient moisture gets absorbed by the ink, when it causes unwanted effects such as the precipitation of one of its solutes, or the separation into different phases. On the other hand, such precipitation or separation may be desired effects.

The gas composition can also be important to prevent electrical discharges. When using high surface tension inks (such as, for example, water-based suspensions) electrical gas discharges can sometimes take place when creating strong enough electrostatic fields in the ink's vicinity between the nozzle and the substrate. Such discharges can be arrested (prevented) by using a high breakdown potential gas, such as carbon dioxide ($CO_2$) or sulfur hexafluoride ($SF_6$).

For continuous jet generation, ink composition needs to satisfy rheological requirements: the ink should be viscoelastic enough to prevent the breakup of the jet into fragments or droplets; and the ink should dry fast enough during its flight, to get deposited as an effectively solid (vitreous jet or rubbery jet with sufficient firmness and stability), which we refer as fiber. When the deposited jet is substantially liquid (which lacks viscoelastic properties and is still able to flow after deposition), the jet will typically accumulate forming undesired deposits such as big droplets on the substrate 7.

To generate the jet from pendant drop 3, an electrostatic field is established between electrically charged nozzle 2 and electrically grounded substrate 7. The jet is generated and accelerated in the Z direction towards substrate 7 by the electrostatic field set between the nozzle 2 and the substrate 7. Alternatively, the same effect can be reached by electrically grounding the nozzle 2 and applying a voltage to the substrate 7. Another possibility is to apply a voltage between the nozzle 2 and a ring extractor electrode, which could be placed near pendant drop 3.

The nozzle-to-substrate separation (in Z direction) should be large enough to allow enough solidification of the jet before it gets deposited on the substrate 7, but it should be small enough to prevent jet whipping (flailing in the air due to the so called kink instability, also known as bending instability). Typically, the nozzle-to-substrate separation is under 10 mm in EHD jet printing.

Power supply 9 applies voltage to the nozzle/pendant drop 2, 3. If the voltage is sufficiently high, pendant drop 3 gets deformed to a pointed tip (e.g. conical, but not necessarily conical) wherefrom a single jet 4 is ejected towards the substrate 7. The jet flies from the jet-ejection point on the pendant drop 3 to the substrate 7. As the jet is accelerated due to the pulling by the electrical stresses, its cross-sectional area typically decreases. When the ink is a liquid solution containing volatile components, as the jet 4 moves towards the substrate 7, volatile components (e.g. solvent) may evaporate from it.

A characteristic parameter of the jet 4 is its diameter, which can be constant but more typically varies along the jet length. The diameter of the collected jet (i.e. fiber diameter) is influenced by various factors, most importantly by the ink composition, evaporation rate of its volatile components, and the stretch rate caused by electrical stresses. Solution-based and melt-based EHD jet printing have different ranges of fiber diameters. Fiber diameter formed from polymer melt ranges between 0.5 μm and 200 μm, more typically in the range between 1 μm and 30 μm. Fiber diameter formed from solvent-based inks ranges between 0.010 μm, and 10 μm, more typically in the range between 0.05 μm and 2 μm.

The speed of the jet 4 as it arrives to the substrate 7, will be referred to as the fiber collection speed or the collection speed of fiber. The fiber collection speed is computed as the length of the jet that arrives to the substrate 7 per second. The fiber collection speed depends on several parameters: ink composition and rheological properties, ink flow rate, evaporation rate (or solidification rate in case of melt), electrostatic field strength and nozzle-to-substrate separation.

The intended printing speed is the preset speed at which the predefined design (e.g. a motif) is intended to be produced forming the printed item.

In the prior art, to print a predefined design, typically the substrate is translated in the XY plane using a mechanical translation stage while the nozzle is fixed, and a jet is accelerated in the Z direction by the electrostatic force set between the ink drop 3 and the substrate 7. In this case, the maximum allowed printing speed (thus the maximum allowed intended speed) equals the actual speed of substrate translation in the XY plane, caused by the translation stage.

In the present invention the translation of substrate or nozzle can be combined with the jet deflection. The jet deflection is used to print items by controlling the jet's position with high temporal resolution, whereas the stage can be translated to translate the substrate 7 or nozzle 2 between consecutive prints or it can be translated during printing event.

To ensure high quality printing by the present invention, the intended printing speed needs to sufficiently match the fiber collection speed. If the intended printing speed is larger than the fiber collection speed, stretching and even breaking of the fiber can take place. If the intended printing speed is lower than the fiber collection speed then undesired fiber accumulation or buckling can take place. The requirement of matching the intended printing speed and fiber collection speed cannot be satisfied by conventional EHD jet printing using mechanical translation stages, because of their insufficient acceleration.

2) Jet Deflection Parameters.

Figure 5:
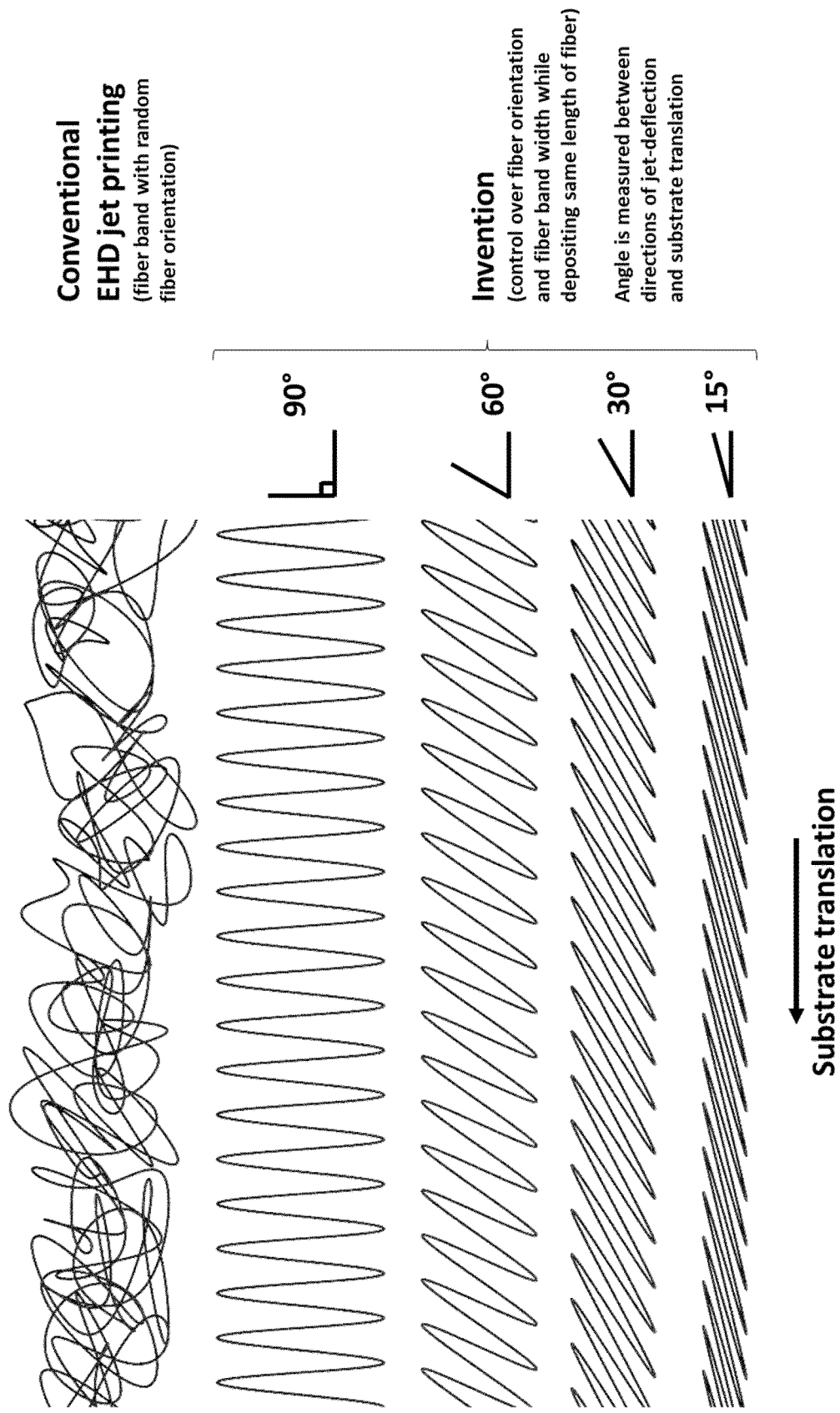
FIG. 5 shows a schematic plan view of the control of fiber alignment and fiber band width by changing jet deflection angle relative to the direction of substrate translation, for the same length of fiber and same substrate translation speed.
Figure 6:
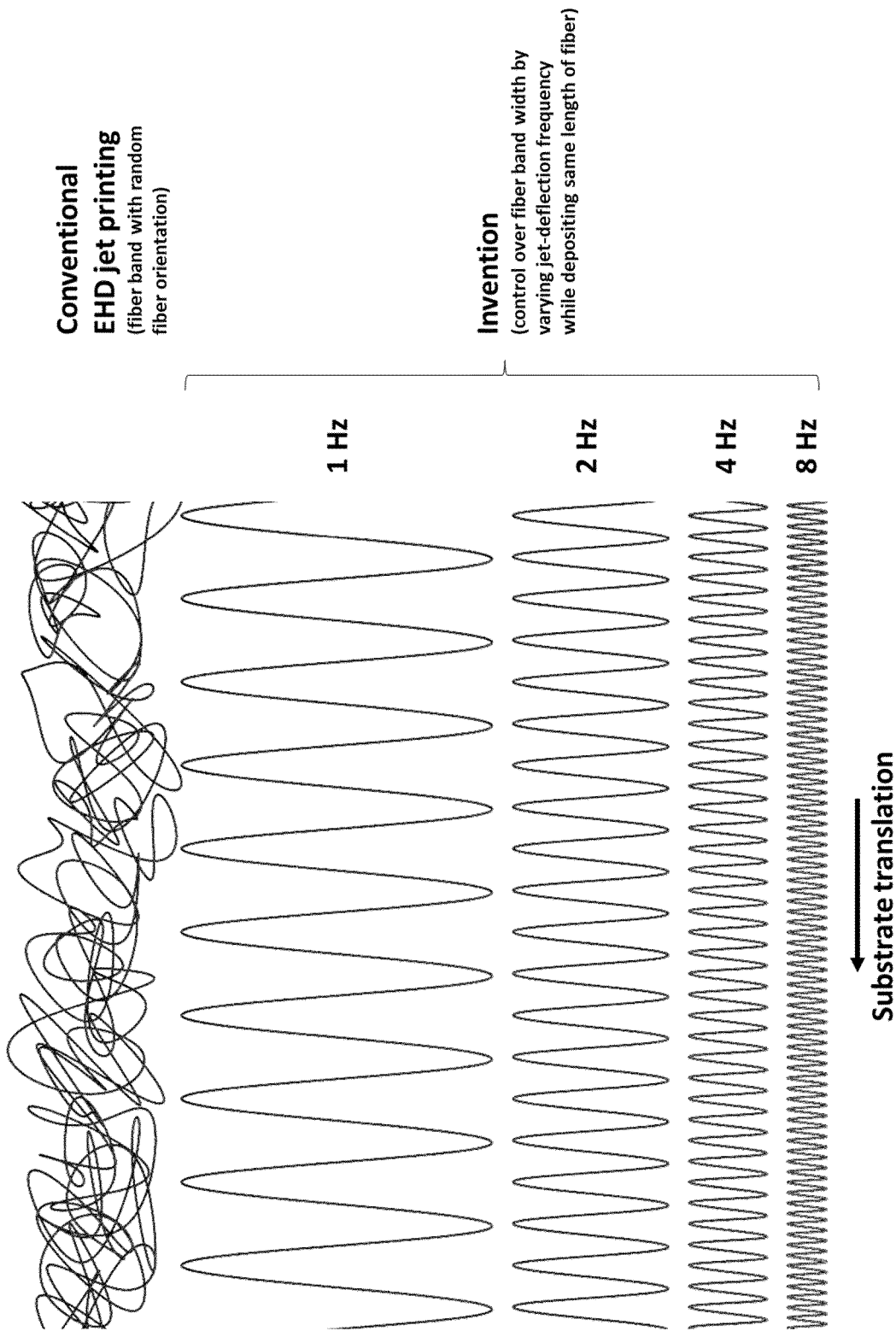
FIG. 6 shows a schematic plan view of the control of fiber alignment and fiber band width by changing the jet deflection frequency, for the same length of fiber and same substrate translation speed.

"Jet deflection" refers here to the method of controlling the jet's trajectory by modifying the electrostatic field surrounding it. Jet deflection enables active control of the position of jet 4 in the XY plane. It can be used in this invention to create a repeating motif with fiber on a substrate. The present invention uses jet deflection, and, optionally, the translation of substrate or nozzle. Jet-deflection can be used to repetitively print a predefined motif by controlling the jet's position with high temporal resolution. When either substrate 7 or nozzle 2 are translated, a repeating sequence of motifs are printed forming a band (the fiber band, as shown on FIG. 5 and FIG. 6).

Acceleration of the jet towards the substrate 7 and its deflection in its flight toward the substrate 7 is driven by electrostatic forces or stresses. Such forces are caused by the action of an electrostatic field onto the jet. Such electrostatic field is created and controlled through the electrical potentials applied to several jet-deflection electrodes 15, 16 and nozzle 2 or pendant drop 3. Such electrostatic field can be viewed as the superposition of two electrostatic fields, one responsible for the generation and transport of the EHD jet toward the substrate (jet generation field), and another one (jet-deflection field), responsible for displacing the jet from its default trajectory in directions normal to such trajectory. The jet-deflection field is created by jet-deflection electrodes 15 and 16 (or 15, 16, 17, and 18), which attract or repel the jet 4 along the Y and X directions, correspondingly.

For the sake of simplicity, the following description assumes that the substrate is electrically grounded. However, this is one embodiment of the invention, whereas other embodiments are possible in which the same or similar differences in electrical potential between electrodes are maintained, and another electrode, for example the nozzle 2, is electrically grounded.

The various situations are not strictly equivalent, as the surroundings of the device also play an electrical influence on the electrostatic field in the printing region, which, although typically small, it is not zero. Those surroundings are typically at the same electrical potential as earth ground; however, a nearby object could change the electrostatic field, distorting the jet's trajectory. In addition, although the simplest embodiment described here assumes only the electrodes described, additional electrodes may be used. For example, in electrospinning and electrospray practice, a "back electrode" is sometimes placed behind the nozzle, and an "extractor electrode" is sometimes placed just ahead of the nozzle to better control the electrostatic field around the drop formed outside the nozzle.

The values of the electrostatic jet-deflection parameters are pre-set typically in a software which is run in a computer 11, and these are used to compute X- and Y-deflection potentials that are generated and amplified by voltage generators 12 and amplifiers 13, 14, and applied to the jet-deflection electrodes 15, 16. The signals can be also applied by a function generator or an AC power supply.

Jet-deflection electrodes geometry, and position (height relative to the pendant drop 3 (parallel to Z axis), and distance from the default jet trajectory (along the X and Y axes)) are all important parameters.

Jet-deflection electrodes 15, 16 height from the substrate 7 (along Z direction) is in the range of between 0 mm and 10 mm, more typically in the range between 1 mm and 4 mm. Jet-deflection electrodes distance from the default jet trajectory (along X and Y directions) is in the range of between 0.1 mm and 2 cm, more typically in the range between 2 mm and 10 mm.

Jet-deflection electrodes positioned near the EHD jet affect the electrostatic field around the jet, perturbing its trajectory or speed. In order not to perturb the jet, a voltage bias can be applied to the jet-deflection electrodes equal to or near the voltage that would be present at their location if the jet-deflection electrodes were not present. In other words, voltage bias makes the jet-deflection electrode electrostatically invisible to the EHD jet 4.

In the present invention, a 3D item can be printed by printing a first layer of fiber, and then laying additional layers of fiber, one at a time on top of a previously deposited layer. Therefore, this printing method involves printing an item sequentially by superimposing layers of fiber.

In this method, the main printing parameters are the amplitude and frequency of the signals applied to the jet-deflection electrodes. Amplitude defines the width of the printed item 5 in X and Y dimensions, and frequency presets how many times the motif is printed per second. When the substrate is not translated while repeatedly printing a motif, a 3D item is printed by the accumulation of layers. The number of layers of such printed item is the product of the printing frequency and time.

Any set of printing parameters with predefined motif geometry, motif size and printing frequency results in corresponding intended printing speed (length of printed motif*frequency=intended printing speed).

The following proposed strategy is used as one example allowing simple conversion between coordinates and voltages of jet-deflection signals, however other strategies providing equivalent functionality can be used.

The signals applied to the jet-deflection electrodes are typically computed by software in a computer 11. A motifs geometry can be described as a multitude of points with coordinates in the XY plane, where the first and last points have the same coordinates. In terms of jet-deflection signals, one motif describes one period of jet-deflection signals both in the X and Y directions. Period duration is the inverse of the frequency of the signal (controlled independently from the motif geometry), i.e. the rate of motif repetition.

Independent digital signals are computed by software in the computer 11 and are applied as an input to the signal generators 12. Digital signals represent X and Y waveforms, which are preferably synchronized. A waveform is typically defined as a series of "waypoints", which are specific voltage targets occurring at specific times along the waveform.

Signal generator 12 converts the digital signals into analog signals. To generate the continuous analog signal needed for jet deflection along a desired motif, digital input signals must have high temporal resolution. For example, for the printing frequency of 1000 Hz, the waveform should have a high enough sampling rate (100-1000 samples per period) to represent the desired printing motif within a single period of 0.001 seconds.

Such temporal resolution of jet-deflection signal sets requirements on signal generator 12 and amplifiers 13, 14, regarding sample rate (samples per second) and slew rate (volts per second), which is the maximum rate at which an amplifier can respond to an abrupt change of input voltage.

The electrical charge carried by the depositing jet to each layer must sufficiently discharge upon deposition on the substrate to allow the next layer to assemble on its top. Otherwise, the printing of high-resolution 3D items by this invention will be unlikely due to electrical charge repulsion between the jet and the printed layers holding the carried electrical charge, and randomly or imprecisely positioned fibers will be collected.

Charge is typically dissipated through the substrate which is electrically connected and typically to earth. Electrical charge held by the deposited fiber is gradually dissipated by arriving image charges, which carry electrical charge of opposite sign from the substrate. Furthermore, after the deposited fiber is completely discharged, more image charges are attracted towards the charged nozzle. Those image charges accumulate on the highest fiber layer (closest to the nozzle) and perturb the electrostatic field around the substrate. Because of such reverse charging of the top-most layer, the incoming jet will be electrostatically attracted to the previously-deposited fiber if reversely charged. This attraction can facilitate accurate deposition of fibers into layers to form a 3D item.

The requirement of fiber discharging puts limits on maximum printing frequency (layers per second) and on the total number of layers per 3D item, but these limits can be extended by using inks with higher electrical conductivity, or by any method which can augment the rate of charge dissipation.

The present invention can be used in different embodiments depending on the number of jet-deflection electrodes used. In the first embodiment, in a 1-electrode-per-axis configuration, 2 independently addressable jet-deflection electrodes 15, 16 are used. In the second embodiment, 4 independently addressable jet-deflection electrodes 15, 16, 17, 18 are used, in a 2-electrode-per-axis configuration, here assumed to be symmetric (in both shape and position) about the default jet trajectory (parallel to Z axis).

Other embodiments can be used in which one, three, or more than four jet-deflection electrodes are used. All such embodiments have the same functionality of being capable of controlling jet positioning during printing.

A 2-electrode configuration used with preset waveforms can result in a printed motif which is deformed compared to the predefined design. This happens because of the asymmetry of the jet-deflection electrode arrangement, which generates an asymmetric electrostatic field in the XY plane.

A 4-electrode configuration can provide a more symmetric electrostatic field with respect to the 2-electrode configuration, but one which is still not radially homogeneous in the XY plane.

To correct for motif deformation, a mathematical algorithm integrated into the software in the computer 11 can be used. This algorithm applies modified signals to the signal generators 12, which are then amplified in amplifiers 13, 14 and applied to the jet-deflection electrodes 15, 16. This method permits to preventively eliminate the deformation, allowing to print a predefined design without deformation.

For developing said mathematical algorithm, the deformation occurring because of unsymmetrical electrostatic field can be theoretically modeled. A more practical approach, however, is to correct the deformation empirically by first printing a test motif and observing the resultant deformation relative to the preset design. Then, the mathematical function which expresses the coordinates of the resultant motif as a function of the coordinates of the preset design is determined. The inverse of this mathematical function is used in the software 11 to preventively correct the deformation. This strategy provides one example of deformation correction by the software, while other strategies providing similar functionality are possible.

The following table shows values of parameters used in the device and method according to the present invention.

"Preferred values" represent range of parameter values currently found most useful. "Invention values" envision range of parameter values which theoretically could be used for jet-deflection printing.

| Parameters | Units | Preferred values | Invention values |
|---|---|---|---|
| Ink flow rate | μl/min | 0.01-0.2 | 0.001-1 |
| Diameter of nozzle tip/opening (O.D.) | pm | 50-300 | 5-2000 |
| Diameter of pendant drop | μm | 100-1000 | 20-2000 |
| Temperature | ° C. | 18-25 | 10-200 |
| Relative humidity | % | 30-70 | 0-95 |
| Nozzle-to-substrate separation (along Z axis) | mm | 2-5 | 0.3-10 |
| Nozzle voltage | V (±) | 800-2000 | 200-10000 |
| Fiber collection speed | mm/s | 3-300 | 0.5-5000 |
| Fiber diameter | nm | 50-2000 | 10-10000 |
| Jet-deflection electrodes height (from substrate, along Z direction) | mm | 1-4 | 0-10 |

-continued

| Parameters values | Units | Preferred | Invention values |
|---|---|---|---|
| Jet-deflection electrodes distance (from default jet trajectory, along X and Y directions) | mm | 2-10 | 0.1-20 |
| Bias voltage | V (±) | 200-500 | 0-2000 |
| Amplitude | V | 100-2000 | 5-10000 |
| Frequency | Hz | 10-500 | 0.1-10000 |
| Number of layers in a printed item | layers | 50-500 | 1-2000 |
| Height of a printed item | μm | 0.05-80 | 0.01-1000 |
| Size of a printed item using jet deflection and no substrate or nozzle translation (X and Y dimensions) | μm | 2-300 | 1-3000 |
| Size of a printed item using substrate or nozzle translation (X and Y dimensions) | μm | 10-30000 | 2-100000000 |

Example 1

3D microscopic items manufactured by EHD jet-deflection printing. Cylindrical 3D items (schematically represented in FIG. 3) were printed with frequency of 100 layers per second (100 Hz), while the translation stage remained still for 0.5 second, which resulted in a 50-layer items. The stage then moved to a new position for a new identical printing event. In this example the ink was composed of 10 wt. % of PEO (polyethylene oxide, average molecular weight of 300 thousand Dalton) in deionized water.

Example 2

Straight free-standing nanowalls built by assembling fibers on the top of each other. Jet oscillated in 1D (longitudinal direction) with frequency 50 Hz, depositing two layers per oscillation period. The XY translation stage was moved in the transverse direction, making stops for printing, such that a wall was printed every 100 μm. Stops of 1.5 s, 1 s and 0.5 s resulted in nanowalls of variable height, composed of 150 layers, 100 layers and 50 layers, respectively. The ink used in this example was composed of 8 wt. % of PEO (polyethylene oxide, average molecular weight of 300 thousand Dalton) in a mixture of deionized water and ethylene glycol (4:1 by weight).

| Parameters | Units | Example 1 | Example 2 |
|---|---|---|---|
| Ink flow rate | μl/min | 0.07 | 0.05 |
| Diameter of nozzle tip/opening (O.D.) | μm | 300 | 100 |
| Diameter of pendant drop | μm | 500 | 500 |
| Temperature | °C | 20 | 18 |
| Relative humidity | % | 60-70 | 35 |
| Nozzle-to-substrate separation (Z) | mm | 3 | 3 |
| Nozzle potential (voltage applied to nozzle) | V (±) | 1000-1100 | 900-1000 |
| Fiber collection speed | mm/s | 3 | 45 |
| Fiber diameter | nm | 200 | 100 |
| Number of jet-deflection electrodes | — | 2 | 1 |
| Jet-deflection electrodes height (from substrate, along Z direction) | mm | 2 | 2 |
| Jet-deflection electrodes distance (from default jet trajectory, along X and Y directions) | mm | 2.5 | 3 |
| Bias | V (±) | 250 | 250 |
| Amplitude | V | 200 | 1400 |
| Frequency | Hz | 100 | 50 (1 Hz = 2 layers) |
| Stop of substrate translation between jet deflection printing events | s | 0.5 | 0.5 - 1 - 1.5 (stops of different duration) |
| Number of layers (of 3D item) | layers | 50 | 50-100-150 (nanowalls of different height) |
| Height of 3D item | μm | ~12 | ~2.5-5-7.5 |
| Width of printed item (X and Y dimensions) | μm | 15 | 450-500 |

Figure 4:
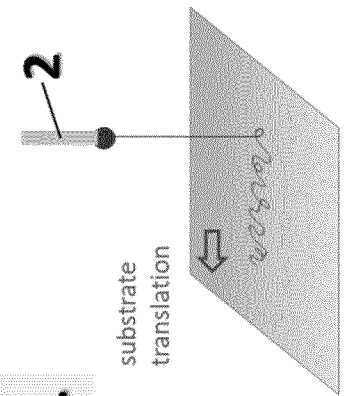
FIG. 4 shows possible printing regimes and their effect on resulting printed item, according to the conventional regimes and according to the present invention.

FIG. 4 schematically shows the various possible printing regimes and their effect on the resulting printed item. In addition to the present invention case (regimes labelled 1', 2', 3'), the figure also shows the case of conventional EHD jet printing (regimes labelled 1, 2, 3).

Printing regimes 1 and 1' correspond to the situation when the fiber collection speed is higher than the intended printing speed. In the case of a substantially solid jet (which is unable to collect into a puddle of liquid), jet buckling (or coiling) can happen due to mechanical interaction between the jet and the substrate (as shown in the figure), resulting in irregular fiber deposition. In the case of a substantially liquid jet (which lacks viscoelasticity, so it is still able to flow after deposition), the jet may form a puddle of liquid on the substrate (not shown in the figure). Regimes 1 and 1' result in poor XY resolution of printed item because of jet buckling.

Printing regimes 2 and 2' correspond to the situation when the fiber collection speed equals the intended printing speed. Straight lines are printed following preset printing design, allowing to print 2D items with high XY resolution. The difference between conventional EHD jet printing and the method of our invention is that much higher intended printing speeds and accelerations are possible by the invention.

Printing regimes 3 and 3' correspond to the situation when the fiber collection speed is lower than the intended printing speed. This results in shortage of available fiber length for printing the intended design. In regime 3 (conventional EHD jet printing) the fiber already adhered on the substrate exerts additional extensional force on the jet at its contact with the substrate. Such extensional force stretches the jet (as shown on FIG. 4), and may result in its breaking (not shown). Even though the stretched jet does not break under the mechanical pull from substrate translation, the length of the collected fiber will be always smaller than the intended length (translated by the translation stage), which will result in "cutting" corners and degrading item geometry compared to the preset design.

In the case of jet deflection (regime 3') jet stretching and breaking are also possible. If the jet is substantially fluid upon its deposition on the substrate, the ink may accumulate on the substrate unpredictably. Such accumulation of ink may firmly fix the contact point between the jet and the substrate, while the jet in the space between the nozzle and the substrate will continue to deflect under the action of electrostatic field.

The printing regimes described above are based on the assumption that both the fiber collection speed $V_{fiber\_collection}$ and the intended printing speed $V_{print\_intended}$ are constant (independent of time). However, the current invention is not limited to this situation.

Figure 3:
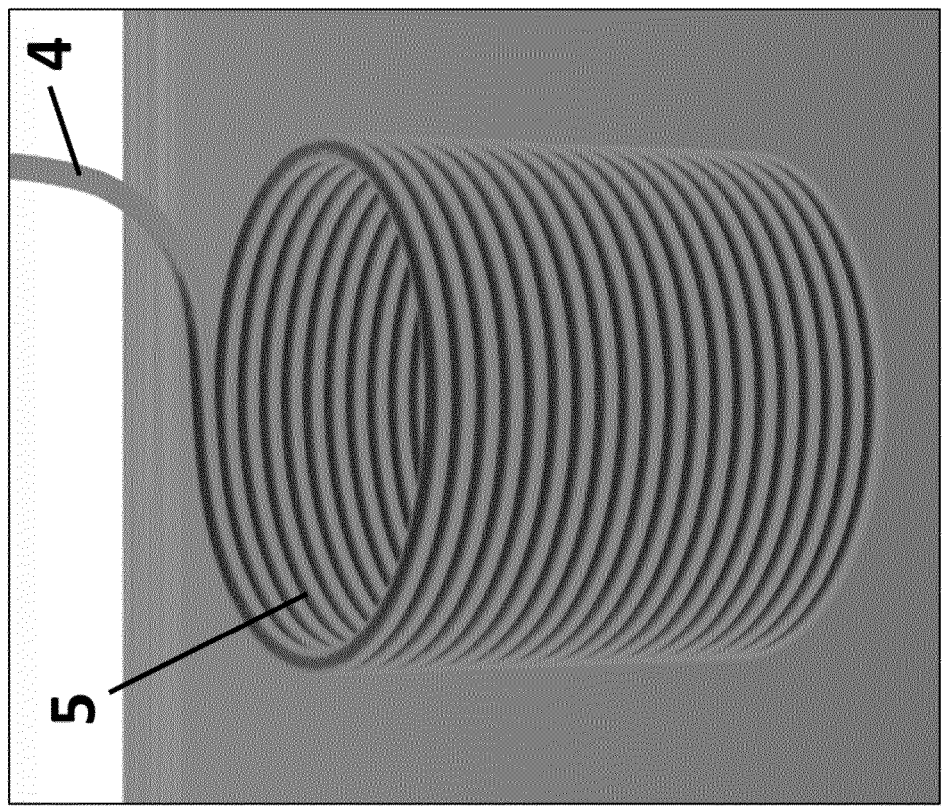
FIG. 3 shows a schematic view (a) representing 2 jet-deflection electrode embodiment used while printing a cylinder as printed item (5) with a stationary substrate; and a magnified view (b) showing the printed item (5) and the arriving jet (4)
Figure 3:
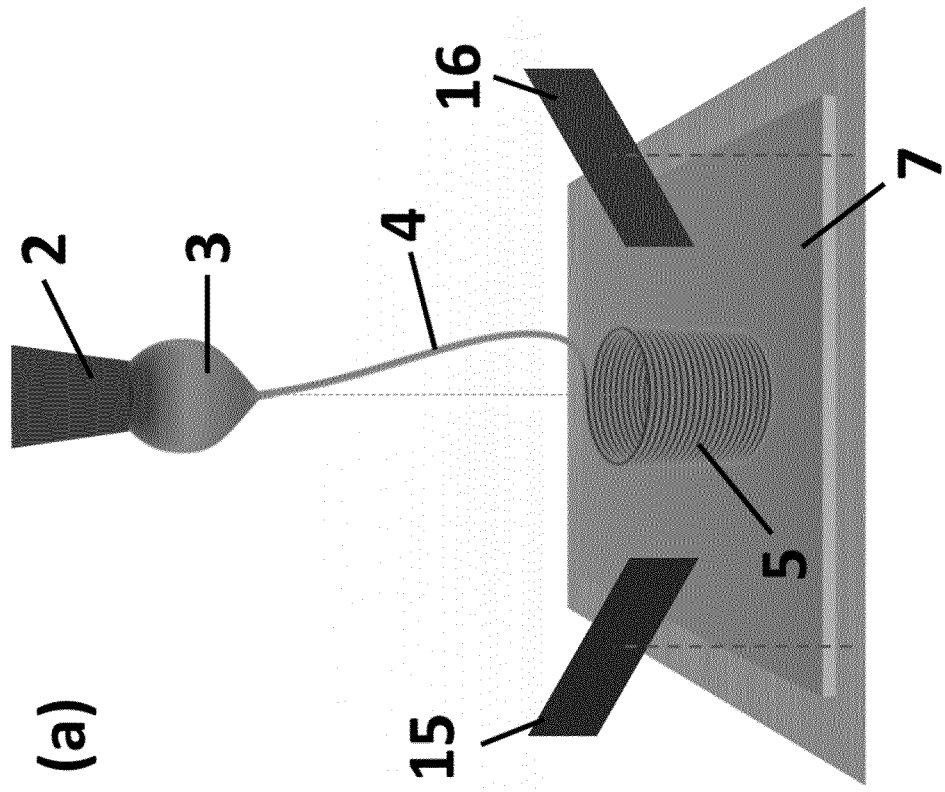

The notion from 1D printing depicted in the FIG. 4 can be extended to 2D and 3D printing. 3D printing becomes possible when 2D layers are stacked, conforming a volumetric or 3D item (as in the example shown in the FIG. 3).

In combination with a translational stage, the present invention allows printing items which are larger than the printing zone 6 defined by the plurality of jet-deflection electrodes 15-16 via the translation of the substrate 7 or the nozzle 2 during the printing process. Combining the translation of substrate or nozzle with jet deflection, it is possible to produce fiber bands with controlled alignment or texture of the printed fiber, thus providing potentially advantageous anisotropic properties. At the same time, it is possible to produce fiber bands with predefined width. This example demonstrates the capability to control fiber orientation on the substrate independently from the translation of the substrate or the nozzle. This strategy allows placing a set amount of fiber into different form-factors (i.e. different fiber bands with predefined width, motif geometry, fiber alignment, etc.). Such capabilities of controlling the orientation of the printed fiber and the width of the collected fiber band (as in the examples shown in FIG. 5 and FIG. 6) may be desirable for the range of applications, including, but not limited to the following:

Printing microelectrodes for energy storage applications: It becomes possible to collect fiber into thinner bands (smaller footprint) which will increase energy storage per unit area of the device.

Printing transparent electrodes (antennas): The printed material can be accurately distributed on the substrate (wider fiber band) to maximize the transparency of the printed item. As well, conductive material can be oriented along the direction of maximum electrical transport to increase the electrical conductivity of the printed item.

Printing biological scaffolds with controlled fiber alignment allows to guide cells growth to form functional tissue with desired properties.

Advantageously, the printing device can incorporate means of monitoring the printed fiber band and the acquired information can be used for online controlling the printing parameters in a closed loop. For example, a machine vision camera can be used to detect the width of a printed fiber band and this information can be used as a feedback to adjust the printing parameters. As another example, a Raman spectrometer can be used to monitor the structure of the printed fiber band.

Even though reference has been made to a specific embodiment of the invention, it is obvious for a person skilled in the art that the device and method described herein are susceptible to numerous variations and modifications, and that all of the details mentioned can be substituted for other technically equivalent ones without departing from the scope of protection defined by the attached claims.

The invention claimed is:

1. A method, comprising:
supplying an ink to a nozzle;
forming an ink drop at an exit of the nozzle;
generating a continuous ink jet from the ink drop, wherein the continuous ink jet carries a net electrostatic charge;
printing a printed item according to a predefined design, wherein the printing comprises:
periodically deflecting the continuous ink jet from a default trajectory by modifying an electrostatic field generated around the continuous ink jet by applying a periodically repeating jet deflection signal to one or more jet deflection electrodes;
collecting the deflected continuous ink jet on a substrate to form a continuous fiber on the substrate;
detecting a width of the printed item; and
controlling a speed of printing to match a speed of collecting the continuous ink jet on the substrate,
wherein the printed item comprises a plurality of repeating motifs connected to one another, wherein each motif is formed by the continuous fiber during a period of the periodically repeating jet deflection signal,
wherein the width of the printed item defines a lateral spread of the plurality of repeating motifs on the substrate,
wherein controlling the speed of printing comprises dynamically adjusting, based on the detected width of the printed item, one or more parameters of the jet deflection signals in a closed loop.

2. The method according to claim 1, wherein the speed of the printing is selected so that the continuous fiber does not break up or buckle on the substrate.

3. The method according to claim 1, further comprising generating the electrostatic field between the nozzle and the substrate.

4. The method according to claim 1, wherein the printing comprises periodically deflecting the continuous ink jet while keeping the substrate and the nozzle in a fixed position relative to one another.

5. The method according to claim 1, wherein controlling the speed of printing comprises adjusting at least one of an amplitude and a frequency of the periodically repeating jet deflection signal.

6. The method according to claim 1, wherein the continuous ink jet is deflected with an acceleration between 100 m/s$^2$ and 500,000 m/s$^2$.

7. The method according to claim 1, wherein the printing comprises sequentially stacking the continuous fiber for a plurality of layers.

8. The method according to claim 1, further comprising applying a voltage bias to the one or more jet deflection electrodes, wherein the voltage bias is equal to a voltage that is generated by the electrostatic field at locations of the one or more deflection electrodes in an absence of the one or more jet deflection electrodes.

9. The method according to claim 1, wherein the ink comprises a polymer solution or a polymer melt.

10. The method of claim 1, wherein the continuous fiber has a width ranging from 50 nm to 1000 nm.

11. The method of claim 1, wherein the nozzle is separated from the substrate by a distance between 2 mm and 5 mm.

12. A method, comprising:
generating a continuous ink jet from a nozzle, wherein the continuous ink jet carries a net electrostatic charge;
printing a test motif according to a predefined design, comprising:
periodically deflecting the continuous ink jet from a default trajectory by modifying an electrostatic field generated around the continuous ink jet by applying a first periodically repeating jet deflection signal to one or more jet deflection electrodes;
collecting the deflected continuous ink jet on a substrate to form a first continuous fiber on the substrate,
wherein the test motif is formed by the first continuous fiber during a period of the first periodically repeating jet deflecting signal;
measuring a difference between the test motif and the predefined design, wherein the difference represents a deformation of the test motif relative to the predefined design caused by an asymmetry in the electrostatic field due to the application of the first periodically repeating jet deflection signal to the one or more jet deflection electrodes;

generating a second periodically repeating jet deflection signal by modifying the first periodically repeating jet deflection signal based on the measured difference; and printing an object according to the predefined design, comprising:

periodically deflecting the continuous ink jet from the default trajectory by modifying the electrostatic field generated around the continuous ink jet by applying the second periodically repeating jet deflection signal to the one or more jet deflection electrodes; and collecting the deflected continuous ink jet on the substrate to form a second continuous fiber on the substrate, wherein the object is formed by the second continuous fiber during a period of the second periodically repeating jet deflection signal, wherein the object matches the predefined design.

13. The method of claim 12, wherein both the first continuous fiber and the second continuous fiber have a width ranging from 50 nm to 1000 nm.

14. The method of claim 12, wherein the nozzle is separated from the substrate by a distance between 2 mm and 5 mm.

15. The method of claim 12, further comprising applying a voltage bias to the one or more jet deflection electrodes, wherein the voltage bias is equal to a voltage that is generated by the electrostatic field at locations of the one or more deflection electrodes in an absence of the one or more jet deflection electrodes.

* * * * *